United States Patent [19] [11] 3,887,232
Dinkel [45] June 3, 1975

[54] HINGE ARRANGEMENT FOR A FOLDING CAR SEAT

[75] Inventor: Emil Dinkel, Weidach, Germany
[73] Assignee: Metallwerk Max Brose & Co., Coburg, Germany
[22] Filed: May 7, 1974
[21] Appl. No.: 467,626

[30] Foreign Application Priority Data
June 6, 1973 Germany.............................. 2328908

[52] U.S. Cl. ............................................. 297/367
[51] Int. Cl............................................. B60n 1/02
[58] Field of Search ...... 16/146; 297/366, 367, 368, 297/369

[56] References Cited
UNITED STATES PATENTS
3,641,838  2/1972  Turner............................ 297/369 X
3,727,978  4/1973  Barbiere et al. ..................... 297/369

FOREIGN PATENTS OR APPLICATIONS
2,134,643  1/1973  Germany ............................. 297/367

Primary Examiner—James C. Mitchell
Attorney, Agent, or Firm—Hans Berman

[57] ABSTRACT

The bottom portion of a folding front seat in a car is connected to the back seat portion by a hinge arrangement having three hinge plates mounted for relative angular movement on a single pivot pin. The first hinge plate is attached to the bottom portion, the second hinge plate may be adjusted angularly relative to the first plate and secured in each of a plurality of angularly adjusted positions, and the third plate may be swung on the hinge pin relative to the second plate between two terminal positions defined by abutments for folding the seat without disturbing the back rest adjustment set between the first and second plates.

8 Claims, 2 Drawing Figures

HINGE ARRANGEMENT FOR A FOLDING CAR SEAT

This invention relates to folding car seats, and particularly to a hinge arrangement for such seats.

A rear seat in a two-door car body can only be reached when the back rest of the corresponding front seat is folded forward. The back rest in such a front seat is commonly secured to the weight supporting bottom portion of the seat by hinges. It is also desirable to make the angle between the supporting portion and the back rest in the normal operating condition of the seat adjustable. The mechanisms for holding the back rest in an adjusted position and for securing the back rest in its operative condition should be independent so that the back rest, when folded forward and thereafter returned to the operative position, resumes an angular position relative to the supporting seat portion which was adjusted prior to folding.

The devices currently available for adjustable, folding, front seats which permit return of the folded back rest to a previously selected angular position are relatively bulky and have operating elements which project from the seat proper transversely to the normal direction of car movement. They may be acceptable in relatively wide cars, but they would limit the width available for the seat cushion and particularly for the back rest cushion in compact and sub-compact cars to such an extent that they were not widely used in small cars.

A primary object of the invention is the provision of a hinge arrangement for connecting the supporting portion and the back rest portion of a folding car seat which occupies but little space, and more specifically, does not reduce the width of the useful space in a car body which is available for the cushions of the seat.

With these and other objects in view, as will presently become apparent, the invention provides a hinge arrangement having three hinge plates connected by a single pivot pin for relative angular movement. The first and second hinge plates may be secured to each other in each of a plurality of angular positions. A two-armed rocker is mounted on the second or third hinge plate for pivoting movement, and each of its arms carries a first engagement member. Two second engagement members are mounted on the third or second hinge plate, whichever does not carry the rocker, and may be aligned with respective first engagement members by pivoting the second and third hinge plates relative to each other on the pivot pin between two terminal positions. The rocker is yieldably biased toward engagement of each first engaging member with an aligned second engaging member.

Other features and many of the attendant advantages of this invention will readily be appreciated as the same becomes better understood by reference to the following detailed description of a preferred embodiment when considered in connection with the appended drawing in which.

Figure 1:
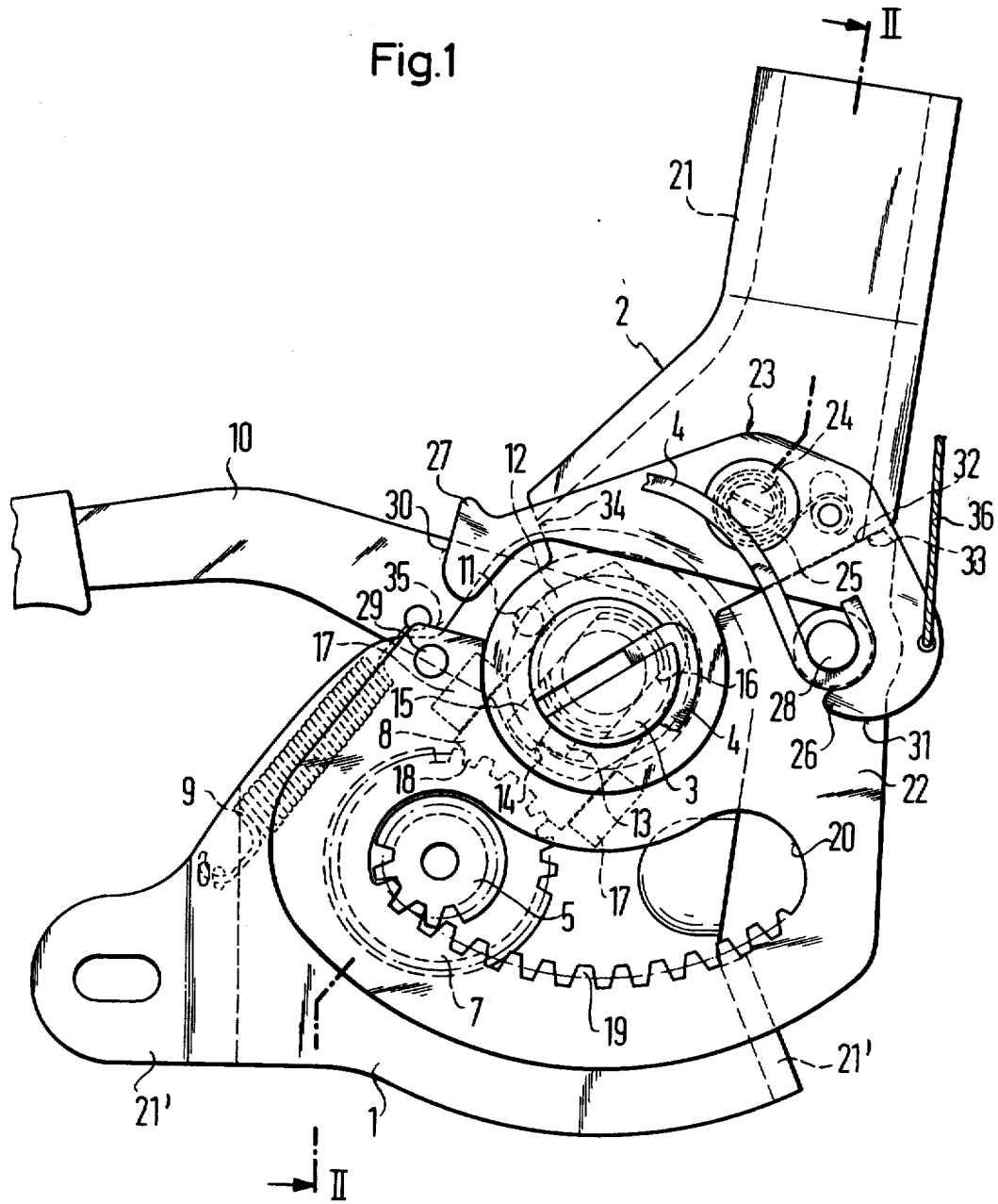
FIG. 1 shows a hinge arrangement of the invention in side elevation.

Referring now to the drawing in detail, and initially to FIG. 1, there is seen a hinge plate 1, normally attached to the frame of the weight supporting portion of a non-illustrated seat, and thereby to the seat cushion by lugs 21'. Another hinge plate 2 is secured to the hinge plate 1 by a heavy, short pivot pin 3 fixedly fastened to the plate 1. Flanges 21 on the plate 2 normally secure the back rest of the seat to the plate 2. A spiral spring 4 is coiled about the pin 3 and will presently be described in more detail. The plates 1, 2 may be locked to each other in a plurality of angular positions relative to the axis of the pin 3 by means of mechanisms associated with an intermediate further hinge plate 22, also pivotally mounted on the pin 3.

Figure 2:
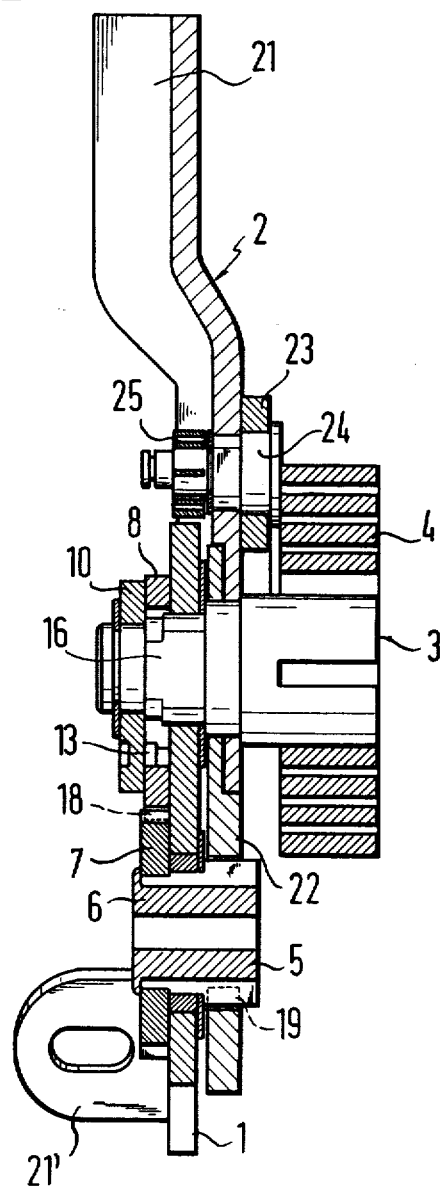
FIG. 2 illustrates the arrangement of FIG. 1 in section on the line II—II.

The first hinge plate 1 rotatably carries a pinion 5 whose teeth are integral with a tubular shaft 6, as is best seen in FIG. 2. The shaft is parallel to the pin 3 and passes through the plate 1. Its end remote from the pinion 5 carries a fixed gear wheel 7. The shaft 6 may be blocked by engagement of the wheel 7 by a toothed slide 8 guided along a line connecting the axes of the pin 3 and of the shaft 6 by flats 16 ground on the pin 3 and by projections 17 on the hinge plate 1.

A helical tension spring 9 is interposed between the hinge plate 1 and an operating arm 10 pivotally mounted on the pin 3 and projecting forward from the back rest along one side of the seat cushion in the installed condition of the hinge arrangement. An abutment pin 11 on the arm 10 engages a lug 12 on the slide 8 when the arm is pivoted clockwise from the position illustrated in FIG. 1 against the restraint of the spring 9 and thereby withdraws the teeth 18 of the slide 8 from the engaged teeth of the wheel 7. When the arm 10 is returned counterclockwise to the illustrated position by the spring 9 or by hand, a fixed cam follower 13 on the arm 10 which moves along a cam face 14 in an opening 15 of the slide 8 pushes the slide 8 into its blocking position in which its teeth 18 engage those of the wheel 7.

The pinion 5 meshes with teeth 19 in a concave segment face of the second or intermediate hinge plate 22, circularly arcuate about the axis of the pin 3 in an opening 20 of the plate 22 which is dimensioned to receive the pinion 5 during its movement along the segment when released by the slide 8.

A two-armed rocker 23 releasably secures the third hinge plate 2 to the intermediate plate 22 in the illustrated condition of the hinge arrangement. The rocker is mounted on the hinge plate 2 for pivoting movement about the axis of a pivot pin 24, parallel to that of the pin 3, and is biased to turn clockwise on the pin 24 by a torsion spring 25 partly coiled about the pin. The two arms of the rocker 23 terminate in integral hooks 26, 27 which both project from the respective arms in a clockwise direction in the axial view of FIG. 1.

The bight of the hook 26 is shown to be abuttingly engaged with an aligned abutment pin 28 on the intermediate hinge plate 22, and the hook 26 is biased into engagement with the aligned pin 28 by the spring 25. The pin 28 also serves as an anchor for the spiral spring 4 so that the spring 4 biases the hinge plate 22 clockwise toward the illustrated position corresponding to the steepest available inclination of the non-illustrated back rest.

The hook 27 may cooperate with an abutment pin 29 on the intermediate plate 22 when the rocker 23 is released from engagement of the hook 26 with the pin 28 by a wire 36 only partly shown in FIG. 1 and omitted from FIG. 2 in order not to crowd the drawing. The wire 36 is the inner member of a Bowden cable, not otherwise shown, which leads to an operating handle on the seat. When the rocker 23 is pivoted counterclockwise by the wire 36, the back rest may be folded forward with the hinge plate 2 until the hook 27 is guided into alignment with the abutment pin 29 by a cam face 30 on the rocker 23. When released thereafter by the wire 36, the rocker is drawn by the spring 25 into abutting engagement of the hook 27 with the pin 29.

When it is desired to return the back rest to the upright, operative position, the wire 36 is pulled to release the hook 27 from the pin 29 and move the hook 26 toward the illustrated position, a movement aided by a guide face 31 associated with the hook 26. The range of folding movement of the third hinge plate 2 relative the intermediate second plate 22 is limited by engagement of two abutment faces 32, 34 on the plate 2 with corresponding faces 33, 35 on the second plate 22, the several faces 32, 33, 34, 35 being located in planes through the axis of the pivot pin 3.

As is best seen in FIG. 2, the hinge plates 1, 22, 2 consist each of heavy sheet metal whose two opposite faces are parallel and separated by the thickness of the plate. This thickness is uniform in each plate except for portions of the plates 2, 22 which are adjacent the pin 3 and axially directly juxtaposed. Each juxtaposed portion is formed with a recess which reduces its thickness and receives the recessed portion of the other hinge plate, the depths of the recesses being chosen in such a manner that the combined thickness of the juxtaposed, reduced portions is equal to the thickness of that portion of the plate 22 which projects beyond the recessed portion and approximately equal to the thickness of the corresponding projecting portion of the hinge plate 2. As is evident from FIG. 2, the close juxtaposition of reduced portions of the plates 2, 22 permits the dimensions of the hinge arrangement in the direction of the seat width to be made very small where they would cause a reduction in the width of the back rest.

The operating position of the back rest is adjusted by the occupant of the seat releasing the slide 8 from the wheel 7 by means of the arm 10, and thereafter shifting the back rest away from the illustrated position against the spring 4 by leaning against the back rest, and releasing the arm 10 when a desired inclination of the back rest is reached. The adjustment is not disturbed when the back rest is folded foward after manual release of the rocker 23 by means of the wire 36 and the non-illustrated handle to which it is attached.

While the rocker 23 has been shown to be mounted on the hinge plate 2 and to cooperate with abutment pins 28, 29 on the intermediate plate 22, this relationship may be reversed without affecting the mode of operation.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A hinge arrangement for a seat of a motor car comprising:
   a. first, second, and third hinge plate members;
   b. a pivot pin connecting said members for relative angular movement thereof about a first axis;
   c. first engaging means mounted on one of said second and third members for pivoting movement about a second axis;
   d. two second engaging means on the other one of said second and third members and alignable with said first engaging means respectively by pivoting of said second and third members relative to each other about said first axis between two terminal positions,
      1. respective portions of said second and third members enveloping said first axis and being axially juxtaposed,
      2. respective other portions of said second and third members projecting from said juxtaposed portions in a direction away from said axis,
      3. the combined axial thickness of said juxtaposed portions being approximately equal to the axial thickness of one of said other portions,
      4. said one portion being axially coextensive with each of said juxtaposed portions;
   e. yieldably resilient means biasing said first engaging means toward engagement with the aligned second engaging means; and
   f. securing means for securing said second member to said first member in each of a plurality of angular positions, said securing means including
      1. a toothed segment on said second member circularly arcuate about said first axis,
      2. a toothed wheel rotatably mounted on said first member in meshing engagement with said segment, and
      3. blocking means for blocking rotation of said wheel.

2. An arrangement as set forth in claim 1, wherein said first engaging means include a two-armed rocker mounted on said one member for pivoting movement about said second axis, the arms of said rocker being hook-shaped, and said second engagement means including two pin members engageable by said hook-shaped arms in said terminal positions respectively.

3. An arrangement as set forth in claim 2, wherein said other portions of the second and third members have cooperating abutment faces engageable for preventing relative angular movement of said second and third members beyond said terminal positions.

4. An arrangement as set forth in claim 2, further comprising manually operable releasing means for releasing said rocker from engagement with said pin members against the biasing of said yieldably resilient means.

5. An arrangement as set forth in claim 1, wherein said second member is formed with an opening extending therethrough in the direction of said first axis, said segment including a plurality of teeth extending from said second member inward of said opening and toward said axis in axial alignment with said juxtaposed portions.

6. An arrangement as set forth in claim 5, wherein said one member is said third member.

7. An arrangement as set forth in claim 3, further comprising a guide face on said rocker associated with each of said arms, each guide face being directed toward the pin member alignable with the associated arm for guiding said associated arm into alignment with said pin member during said movement of said rocker.

8. An arrangement as set forth in claim 4, wherein said releasing means include means for releasing said blocking means.

* * * * *